United States Patent
Huotari et al.

(10) Patent No.: US 9,451,422 B2
(45) Date of Patent: Sep. 20, 2016

(54) METHOD, SYSTEM AND NETWORK DEVICE FOR ROUTING A MESSAGE TO A TEMPORARILY UNAVAILABLE NETWORK USER

(75) Inventors: Seppo Huotari, Espoo (FI); Markku Tuohino, Espoo (FI); Krisztian Kiss, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 1591 days.

(21) Appl. No.: 10/462,824

(22) Filed: Jun. 17, 2003

(65) Prior Publication Data
US 2004/0184452 A1    Sep. 23, 2004

Related U.S. Application Data

(60) Provisional application No. 60/454,632, filed on Mar. 17, 2003.

(51) Int. Cl.
*H04W 4/12*    (2009.01)
*H04L 12/58*   (2006.01)
(Continued)

(52) U.S. Cl.
CPC .............. *H04W 4/12* (2013.01); *H04L 12/585* (2013.01); *H04L 12/5815* (2013.01); *H04L 29/06* (2013.01); *H04L 45/00* (2013.01); *H04L 51/043* (2013.01); *H04L 51/12* (2013.01);
(Continued)

(58) Field of Classification Search
CPC ........... H04M 3/42348; H04W 4/025; H04W 64/003; H04W 80/10; H04W 4/12; H04L 12/5815; H04L 12/585; H04L 29/06; H04L 45/00; H04L 65/1069; H04L 67/14; H04L 67/24

USPC .............. 370/328, 338, 352, 259, 271, 351; 709/203; 455/417, 421
See application file for complete search history.

(56) References Cited

U.S. PATENT DOCUMENTS 5,444,702 A    8/1995  Burnett et al.
6,259,925 B1 *  7/2001  Josse .............................. 455/466
(Continued)

FOREIGN PATENT DOCUMENTS

CN    1279864 A       1/2001
EP    0 833 532 A2    4/1998
(Continued)

OTHER PUBLICATIONS

A.B. Roach, Session Initiation Protocol (SIP)—Specific Event Notification, Jun. 2002, Network Working Group, dynamicsoft.*
(Continued)

*Primary Examiner* — Un C Cho
*Assistant Examiner* — Jeremy Costin
(74) *Attorney, Agent, or Firm* — Mintz Levin Cohn Ferris Glovsky and Popeo, P.C.

(57) ABSTRACT

A method, system and network device routes a message to a temporarily unavailable network user, wherein a subscription to a registration state of the network user is initiated if the network user is indicated as being unavailable. Then, a notification is generated, when the registration state of the network user is changed to indicate a state when the network user is available again or when the network user is registered again, and the message is routed to the network user in response to receiving the notification. Thereby, network elements or servers generating messages can be informed about the connection state of the network user.

21 Claims, 4 Drawing Sheets

(51) Int. Cl.
*H04L 29/06* (2006.01)
*H04L 12/701* (2013.01)
*H04L 29/08* (2006.01)

(52) U.S. Cl.
CPC .......... *H04L65/1069* (2013.01); *H04L 67/14* (2013.01); *H04L 67/24* (2013.01); *H04L 65/1016* (2013.01); *H04L 69/329* (2013.01)

(56) References Cited

U.S. PATENT DOCUMENTS

| | | | |
|---|---|---|---|
| 6,529,737 B1 * | 3/2003 | Skinner et al. | 455/466 |
| 6,611,516 B1 * | 8/2003 | Pirkola et al. | 370/352 |
| 7,043,246 B2 * | 5/2006 | Uskela | 455/445 |
| 7,349,687 B2 * | 3/2008 | Murri et al. | 455/415 |
| 7,623,529 B2 * | 11/2009 | Hurtta et al. | 370/401 |
| 2002/0090950 A1 | 7/2002 | Uskela | |
| 2003/0040280 A1 * | 2/2003 | Koskelainen | 455/67.1 |
| 2003/0097413 A1 * | 5/2003 | Vishik et al. | 709/206 |
| 2003/0108002 A1 * | 6/2003 | Chaney et al. | 370/261 |
| 2003/0165119 A1 * | 9/2003 | Hsu et al. | 370/258 |
| 2003/0198180 A1 * | 10/2003 | Cambron | 370/216 |
| 2004/0024865 A1 * | 2/2004 | Huang et al. | 709/224 |
| 2004/0038688 A1 * | 2/2004 | Zabawskyj et al. | 455/456.3 |
| 2004/0054714 A1 * | 3/2004 | Wuerfel et al. | 709/203 |
| 2004/0062383 A1 * | 4/2004 | Sylvain | 379/265.06 |
| 2004/0103157 A1 * | 5/2004 | Requena et al. | 709/206 |
| 2004/0176128 A1 * | 9/2004 | Grabelsky et al. | 455/553.1 |
| 2005/0071679 A1 * | 3/2005 | Kiss et al. | 713/201 |

FOREIGN PATENT DOCUMENTS

| | | | |
|---|---|---|---|
| EP | 1606913 A1 | 12/2005 | |
| JP | 8-023577 A | 1/1996 | |
| RU | 2189072 | 9/2002 | |
| RU | 2197792 | 1/2003 | |
| WO | WO-9931846 A1 | 6/1999 | |
| WO | WO-0079761 A1 | 12/2000 | |
| WO | WO 02/07396 | 1/2002 | |
| WO | WO 0232084 A2 * | 4/2002 | |
| WO | WO094553 * | 5/2002 | H04Q 7/22 |
| WO | WO 02052881 A1 * | 7/2002 | |
| WO | WO-02091780 A1 | 11/2002 | |
| WO | WO-2004084510 A1 | 9/2004 | |

OTHER PUBLICATIONS

Rosenberg et al., RFC 3261, SIP: Session Initiation Protocol, Jun. 2002, pp. 185-190.*

A. B. Roach, RFC 3265—Session Initiation Protocol (SIP)—Specific Event Notification, Jun. 2002, all pages.*

Rosenberg et al. "SIP Extensions for Presence" IEEE Internet Draft; Mar. 2, 2001; pp. 1-39.

Rosenberg J. et al. "A Session Initiation Protocol (SIP) Event Package for Registrations" Internet Engineering Task Force Internet Draft; Oct. 28, 2002; pp. 1-22.

3GPP TS 23.228 V6.0.0 "3$^{rd}$ Generation Partnership Project; Technical Specification Group Services and System Aspects; IP Multimedia Subsystem (IMS); Stage 2 (Release 5)"; Jan. 2003; pp. 1-128.

* cited by examiner

Legend

UE = User Equipment
HSS = Home Subscriber Server
CSCF = Call State Control Function
P-CSCF = Proxy CSCF
S-CSCF = Serving CSCF
S-CSCFo = old S-CSCF S-CSCFn = new S-CSCF
I-CSCF = Interrogating CSCF
HN = Home Network
VN = Visited Network
AS = Application Server

METHOD, SYSTEM AND NETWORK DEVICE FOR ROUTING A MESSAGE TO A TEMPORARILY UNAVAILABLE NETWORK USER

CROSS-REFERENCE TO RELATED APPLICATIONS

This application claims priority of U.S. Provisional Application Ser. No. 60/454,632 entitled, "Method, System and Network Device for Routing a Message to a Temporarily Unavailable Network User," filed Mar. 17, 2003, the entire contents of which are incorporated herein by reference.

BACKGROUND OF THE INVENTION

1. Field of the Invention

The present invention relates to a method, system and network device for routing a message, e.g. a Multimedia Messaging Service (MMS) notification, to a temporarily unavailable network user, e.g. a subscriber in an Internet Protocol Multimedia Subsystem (IMS).

2. Description of the Related Art

In order to achieve access independence and to maintain a smooth interoperation with wired terminals across the Internet, the IMS as specified e.g. in the 3GPP specification TS 23.228 has been developed to be conformant to IETF (Internet Engineering Task Force) "Internet Standards". The IP multimedia core network (IM CN) subsystem enables network operators of mobile or cellular networks to offer their subscribers multimedia services based on and built upon Internet applications, services and protocols. The intention is to develop such services by mobile network operators and other $3^{rd}$ party suppliers including those in the Internet space using the mechanisms provided by the Internet and the IM CN subsystem. The IMS thus enables conversions of, and access to, voice, video, messaging, data and web-based technologies for wireless users, and combines the growth of the Internet with the growth in mobile communications.

FIG. 1 shows an architecture of an IMS network according to the above 3GPP specification. The architecture is based on the principle that the service control for home subscribed services for a roaming subscriber is in the home network HN, for example, a Serving Call State Control Function (S-CSCF) is located in the home network HN. In FIG. 1, a current or old S-CSCFo 10 and a future or new S-CSCFn 12 are shown, between which a terminal device or user equipment (UE) 40 can be transferred e.g. due to changed required capabilities resulting from a change in the subscriber profile or network coverage of the UE 40.

In general, an S-CSCF performs the session control service for the served UEs. It maintains a session state as needed by the network operator for support of the services which may be provided by an application server (AS) 60 which may be located as well in the home network HN or a visited network VN. Within an operator's network, different S-CSCFs may have different functionalities. The functions performed by the S-CSCF during a respective session are, for example, registration, session flow management, charging and resource utilization management. When a subscriber roams to the visited network VN, the visited network VN supports a Proxy-CSCF (P-CSCF) 30 which enables the session control to be passed to the respective S-CSCF located at the home network RN and provides the service control. Furthermore, an Interrogating-CSCF (I-CSCF) 50 is provided in the home network HN as a contact point within the operator's network for all connections destined to a subscriber of that network operator, or a roaming subscriber currently located within that network operator's service area. There may be multiple I-CSCFs within an operator's network. The functions performed by the I-CSCF 50 include assigning an S-CSCF to a user performing a registration procedure, routing a request received from another network towards the S-CSCF, maintaining the address of an S-CSCF from a subscriber database, e.g. a Home Subscriber Server (HSS) 20 as shown in FIG. 1, and/or forwarding requests or responses to the S-CSCF determined based on the address of change from the HSS 20.

The P-CSCF 30 is the first contact point within the IMS. Its address is discovered by the UE 40 following a PDP (Packet Data Protocol) context activation. The P-CSCF 30 behaves like a proxy. Namely, it accepts requests and services them internally or forwards them on, possibly after translation. The P-CSCF 30 may also behave as a User Agent. In other words, in abnormal conditions, the P-CSCF 30 may terminate and independently generate transactions. The P-CSCF 30 forwards register requests received from the UE 40 to an I-CSCF, for example, the I-CSCF 50, determined using the home domain name as provided by the UE 40. The P-CSCF 30 forwards requests or responses to the UE 40.

Further details regarding the functions of the different CSCF elements shown in FIG. 1 can be gathered from the above mentioned 3GPP-specification.

The IETF has been specifying a Session Initiation Protocol (SIP) event package for registrations, as defined in "draft-ietf-sipping-reg-event". Through its REGISTER method, the SIP allows a user agent, which is an interface (e.g. browser) between the user and the network application, to create, modify, and delete registrations. Registrations can also be altered by administrators in order to enforce policy. As a result, these registrations represent a piece of state in the network that can change dynamically. There are many cases where a user agent would like to be notified of changes in this state. The event package defines a mechanism by which those user agents can request and obtain such notifications.

The SIP REGISTER method provides a way for a user agent to manipulate registrations. Contacts can be added or removed, and the current set of contacts can be queried. Registrations can also change as a result of administrator policy. For example, if a user is suspected of fraud, his registration can be deleted so that they cannot receive any requests. Registrations also expire after some time if not refreshed. Thus, registrations represent a dynamic piece of state maintained by the network. The SIP Events Framework defines a generic framework for subscription to, and notification of, events related to SIP systems. The framework defines the methods SUBSCRIBE and NOTIFY, and introduces the notion of a package. A package is a concrete application of the event framework to a particular class of events, e.g. registration states.

The SUBSCRIBE message for the registration package may contain a body for filtering the subscription. It may be sent with or without the body. The default registration policy is that notifications are triggered from a SUBSCRIBE message and are generated every time there is a change in the state of any of the registered contacts for the resource being subscribed to. Those notifications only contain information on the contacts whose state has changed. The notifications are forwarded using the NOTIFY message, which includes in its body a registration information document that describes some or all of the contacts associated with a particular address-of-record.

In the 3GPP IMS Release 5 specifications TS 24.229, 24.228 and 23.218, the SIP registration state event package is used to inform the subscribers of the event package about the user's registration state. The 3GPP IMS Release 6 may introduce new services to the system, such as Presence, Messages, Conferencing and MMS. There are services like MMS which can utilize the capabilities of the IMS network. The IMS network is able to provide accurate information on the user's registration state using the SIP registration state event package and it also carries the MMS notification using e.g. the SIP MESSAGE request.

According to the IMS Release 5 specifications, the IMS subscriber is either registered or deregistered. However, although being registered, the IMS subscriber may not be reachable e.g. due to battery loss, temporary radio coverage loss at the current location of the subscriber, which is quite normal in big cities or areas where the radio coverage is for some reasons spotty. Consequently, external services utilizing the IMS network cannot be notified if a service user in not reachable.

SUMMARY OF THE INVENTION

The invention provides a method, system and network device wherein an application server utilizing the IMS network for forwarding a message can be made aware if a service user is not available.

According to one embodiment, a method of routing a message to a temporarily unavailable network user. The method includes the steps of:
  subscribing to a state event package of the network user;
  generating a notification when the state event package of the network user is changed to indicate a state when the network user is available again or when the network user is registered again; and
  routing the message to the network user in response to the receipt of the notification.

According to another embodiment, a network device for serving a network user in a data network is provided. The network device is configured to store a state event package indicating that the network user is unregistered or registered but not available, and to generate a notification to a subscriber of the state event package if the state event package indicates that the network user is available.

According to a further embodiment, a network server for generating messages to be routed to network users is provided. The network server is configured to subscribe to a state of a non-available network user and to route a message to the non-available network user in response to the receipt of a state notification indicating that the non-available network user is available.

Accordingly, an external application server can be subscribed to the registration state of a network user and can thus be notified if the network user is registered. Additionally, the network user may not be available even though registered. Thereby, external services utilizing the IMS network can be notified about the availability of the network user as experienced by the IMS network.

In the present invention, the term "unavailable" is to be understood in a sense to cover all scenarios when the subscriber cannot be reached, i.e. also such situations where the network user intentionally does not want to be disturbed e.g. due to a meeting.

Furthermore, a notification may include an information indicating that the network user is reachable again even though the registrations state is unaffected. In particular, this information may be an event or flag information. It may be set to a state indicating that the network user is available, after a terminal device of the network user performs an outgoing session setup or an incoming session setup attempt is successful. The re-registration may be determined based on a notification about a re-assignment of the network user. Then, the subscription may be refreshed in response to the notified re-registration.

BRIEF DESCRIPTION OF THE DRAWINGS

In the following, the present invention will be described in greater detail based on preferred embodiments with reference to the accompanying drawings, in which.

DESCRIPTION OF THE PREFERRED EMBODIMENTS

Figure 1:
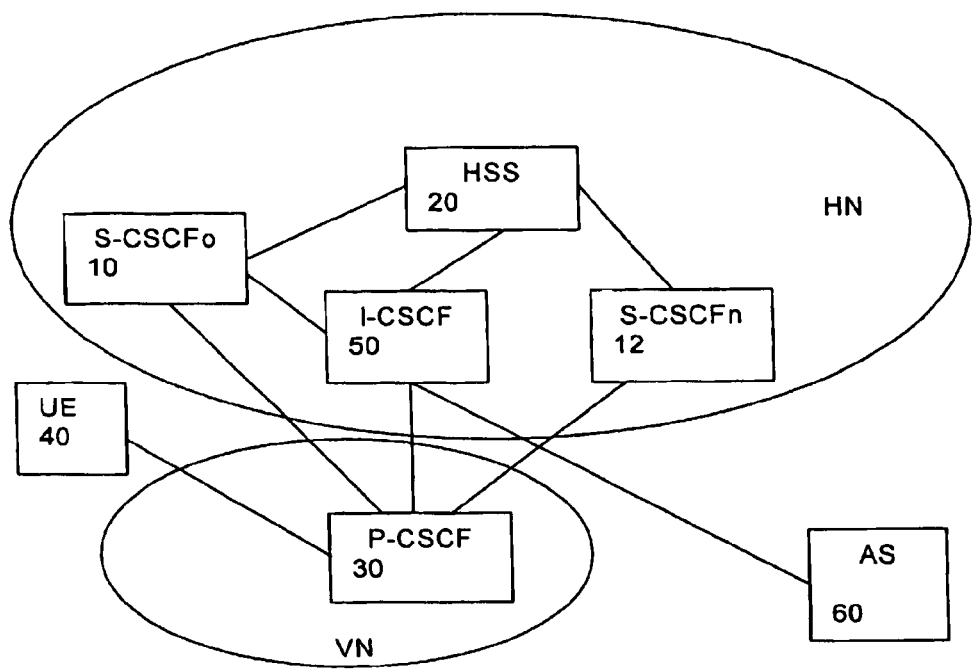
FIG. 1 shows a schematic block diagram of a network architecture in which the preferred embodiments of the invention can be implemented.

Various embodiments of the invention will now be described on the basis of a delivery of an MMS notification in an IMS network architecture as shown in FIG. 1.

The IMS architecture shown in FIG. 1 refers to a set of core network entities using the services provided by the packet-switched domain to offer multimedia services. The HSS 20 is the master database for a given user and includes the functions of conventional home location registers (HLRs) as well as new functionalities specified to IP networks, such as the IMS. The HSS 20 is the entity containing the subscription-related information to support the network entities actually handling calls and/or sessions.

Figure 2:
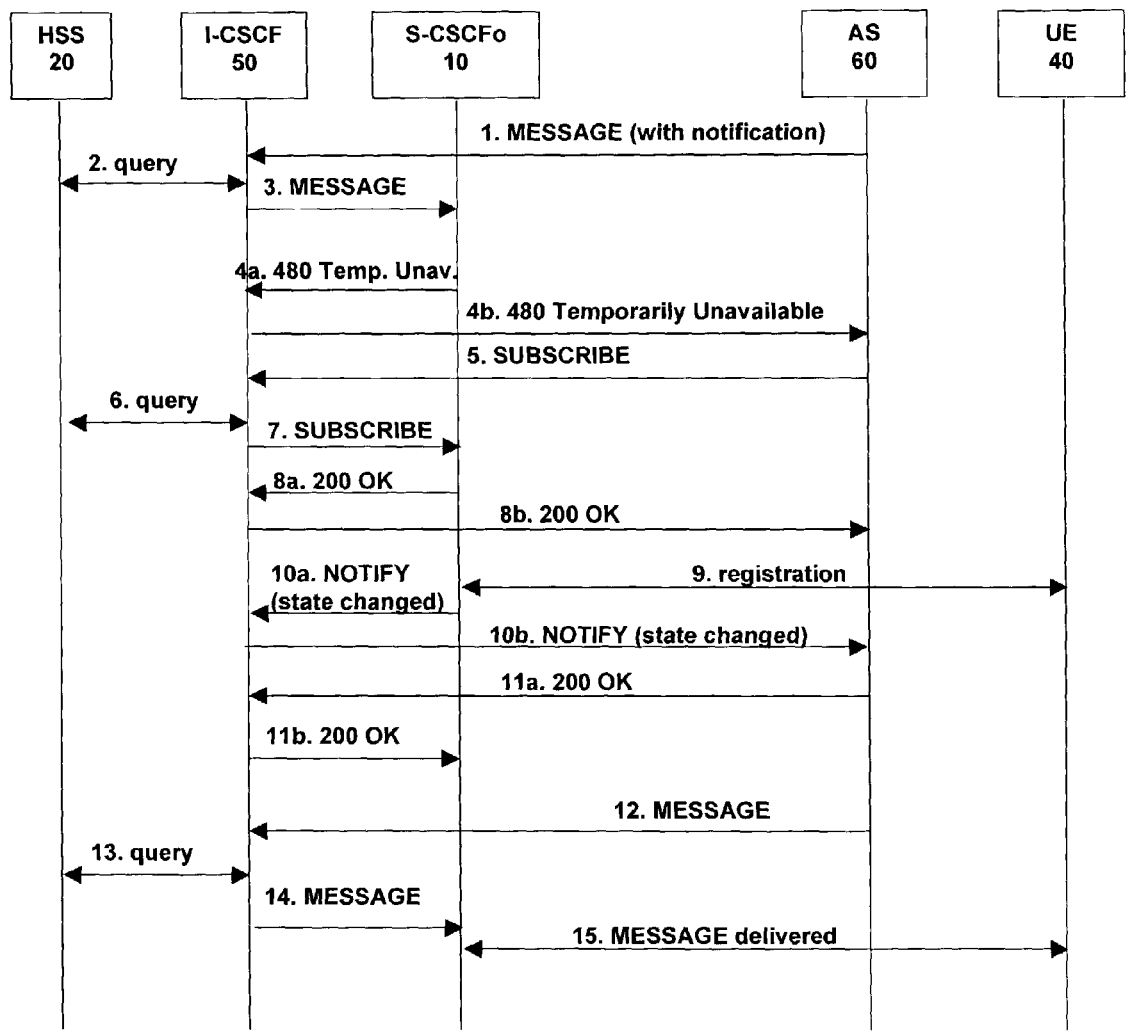
FIG. 2 shows a message signaling and processing diagram indicating delivery of a notification to an IMS subscriber according to the first preferred embodiment.

FIG. 2 shows a schematic signaling diagram according to the first preferred embodiment where the Application Server (AS) 60 delivers its MMS notification to the IMS subscriber of the UE 40 using a registered/unregistered information of the registration state event package to be notified when the subscriber is registered again and thus available.

According to a first embodiment, a SIP-based solution for the MMS notifications utilizing existing capabilities of the IMS network is proposed.

When the AS 60, which may be an MMS server, intends to deliver the MMS notification to the IMS user or subscriber, it generates a SIP MESSAGE request and includes the direct or indirect notification as the payload of the request (step 1). If the IMS subscriber is not registered at this point, the MESSAGE request is not delivered to the UE 40 but is rather rejected by a default S-CSCF, e.g. the S-CSCFo 10, using a SIP error response, e.g. SIP 480 Temporary Unavailable. Here, the AS 60 corresponds to a SIP AS in the IMS network architecture and acts as a SIP User Agent. It is assumed that the AS 60 is capable of originating its own request and serving as a proxy for the user by e.g. querying for the user's S-CSCF on the Sh interface or sending the request to the I-CSCF 50. As the user is currently not registered, it is also assumed that the registration state information can also be provided when the user is unregistered. Hence, registration state provision equals to a service which pertains also to the unregistered state. If the user has services related to the unregistered state, i.e. the HSS 20 stores a user profile for the unregistered state, then a default S-CSCF will be allocated to handle the request. As the user is not registered, there is no path stored by the S-CSCFo 10 towards the UE 40, so that the S-CSCFo 10 will reject the incoming SIP MESSAGE request by responding with a 4xx SIP failure response.

More details concerning path creation can be obtained from the 3GPP specification TS 24.229.

According to FIG. 2, the I-CSCF 50 initiates a query to the HSS 20 (step 2), in response to the receipt of the SIP MESSAGE request from the AS 60, to obtain a routing information. Then it forwards the MESSAGE request in step 3 to the default S-CSCFo 10 which responds to the AS 60 in steps 4*a* and 4*b* with a SIP 480 Temporary Unavailable response. As the MESSAGE request is rejected, the AS 60 subscribes to the user's registration state by forwarding a SUBSCRIBE request for the registration state event in the same way as the previously sent MESSAGE request, e.g. by proxying the request to the I-CSCF 50 (step 5), which can query the HSS 20 in step 6 for the user's S-CSCF. Based on the fact, whether the previously allocated S-CSCFo 10 was de-allocated or not, there might be a need to allocate a new default S-CSCF to handle the SUBSCRIBE request.

When the S-CSCFo 10 receives the SUBSCRIBE request in step 7, it needs to authenticate and authorize it, as required by the IETF specification RFC 3265. The successful subscription is acknowledged with a SIP 200 OK response in steps 8*a* and 8*b*. In 3GPP IMS, the authentication is solved with the help of the IETF specification RFC 3325, wherein the AS 60 inserts its trustable identity to the SIP request. Based on this, the S-CSCFo 10 can decide whether the AS 60 is an authorized subscriber for the particular user's registration state, and if yes, it can install the subscription. According to the 3GPP specification N1-030285, all application servers of the HN are authorized to subscribe for the registration event package. Therefore, the AS 60 is authorized if it belongs to HN.

However, when the user or IMS subscriber registers (again) in step 9, a NOTIFY request sent in steps 10*a* and 10*b* by the S-CSCFo 10 will inform the AS 60 about the changes in the user's registration state. The AS 60 acknowledges the receipt by a SIP 200 OK response in steps 11*a* and 11*b*. Thus, the AS 60 can re-initiate its MESSAGE request and route it via the S-CSCFo 10 to the UE 40 in steps 12 and 14 (HSS query by I-CSCF 50 in step 13), to finally forward and deliver the MMS notification to the IMS subscriber of the UE 40 in step 15.

Figure 3:
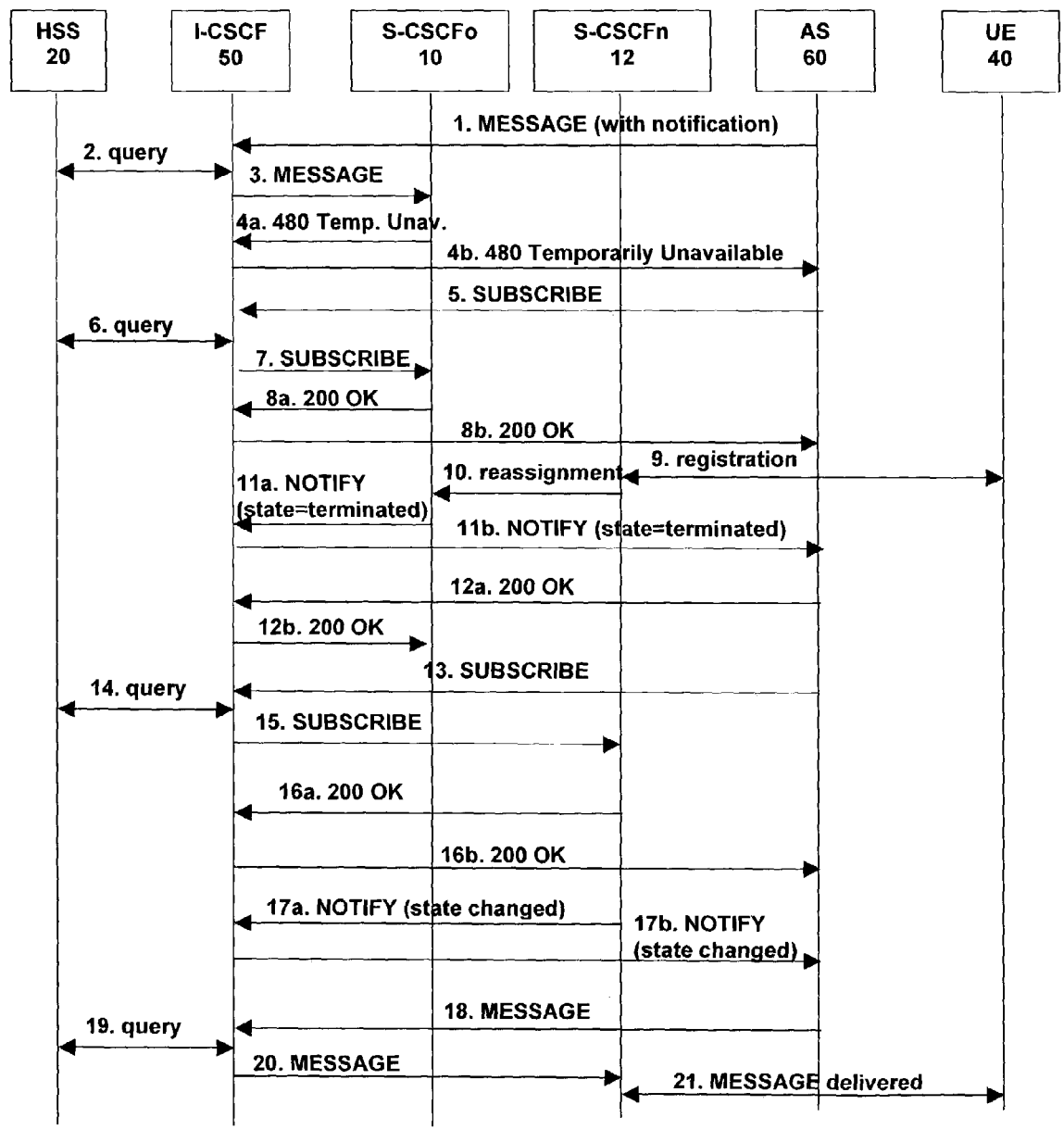
FIG. 3 shows a message signaling and processing diagram indicating delivery of a notification to an IMS subscriber according to the second preferred embodiment.

FIG. 3 shows a schematic signaling diagram according to the second preferred embodiment where the AS 60 delivers its MMS notification to the IMS subscriber of the UE 40 using a refreshing subscription based on a subscription migration to the newly allocated S-CSCFn 12.

In FIG. 3, steps 1 to 9 correspond to the first preferred embodiment as shown in FIG. 2, such that a description thereof can be omitted here for reasons of simplicity.

However, when the user or IMS subscriber registers (again) in step 9, it is possible that the new S-CSCFn 12 will be assigned for it, since the assigned S-CSCF needs to have correct capabilities related to the registered state. In this case, the old S-CSCFo 10 will be informed about the re-assignment (step 10) via the Cx interface as described in the 3GPP specification TS 23.228. At this point, before the S-CSCFo 10 drops the user's profile, it migrates the subscription to the newly assigned S-CSCFn 12 by issuing a SIP NOTIFY request in steps 11*a* and 11*b* including the subscription-state header containing a value "terminated". The AS 60 responds with a SIP 200 OK acknowledgement in steps 12*a* and 12*b*.

According to the IETF specification RFC 3265, when performing subscription migration, the AS 60 initiates a re-subscription in step 13. After HSS query by the I-CSCF 50 in step 14, the SUBSCRIBE request in forwarded to the S-CSCFn 12 in step 15. The S-CSCFn 12 responds with a SIP 200 OK acknowledgement in steps 16*a* and 16*b*. Thus, with the help of migration, the subscription refreshing SUBSCRIBE request may terminate at the newly allocated S-CSCFn 12, which will perform the authentication and authorization steps as described above and will install the subscription.

As the user or IMS subscriber is now registered, a NOTIFY request sent in steps 17*a* and 17*b* by the new S-CSCFn 12 will inform the AS 60 about the changes in the user's registration state. Thus, after acknowledgement (not shown), the AS 60 can re-initiate its MESSAGE request and route it via the S-CSCFn 12 (HSS query in step 19) to the UE 40 in steps 18 and 20, to finally forward and deliver the MMS notification to the IMS subscriber of the UE 40 in step 21.

At this point, the AS 60 may decide to terminate the subscription to the user's registration state or it may keep the subscription. Assuming the latter case, the subscription will be terminated when the user deregisters itself or the network decides to perform a network initiated deregistration procedure. This is because the S-CSCFn 12 is de-allocated at this point and another S-CSCF might be allocated to handle the unregistered state. This procedure is described in the 3GPP specification N1-030296 and TS 24.229.

Thus, in case where the subscription of the AS 60 is terminated, i.e. it receives a NOTIFY request including a subscription-state header containing the value "terminated", it needs to refresh its subscription according to S-CSCFn 12 if it still wants to receive further notifications on the user's registration state.

According to the third preferred embodiment, a network user or IMS subscriber can be identified as being registered but still not reachable. To achieve this, the S-CSCFs are adapted to maintain in the registered state event package or in a new state event package a further information indicating whether the subscriber is reachable or not. As an example, the subscriber can be unreachable if there is a battery loss or temporary radio coverage loss at the subscriber's current location. The S-CSCF can identify this situation if the terminating traffic is not successfully delivered to the subscriber. Thus, a new event for the state when the subscriber is registered but not reachable, e.g. "not reachable" or "out of coverage" is introduced. Hence, when the subscriber is registered, the state can be either "reachable" or "unreachable".

In particular, the state "reachable" may be set if the terminating traffic to the subscriber succeeds or an incoming session setup attempt is successful, or the terminal device or UE 40 makes a normal outgoing session set-up, or there is a normal re-registration of the UE 40. However, when the state is set to "unreachable" it still does not prevent the terminating traffic. But when a message sent from the AS 60, e.g. a MMS server or the like, fails, the AS 60 can subscribe to the S-CSCF in order to find out when the subscriber becomes reachable again. To achieve this, the AS 60 is subscribed for the registration event package or the other new event package of the subscriber.

Thus, a finer granularity for the registration event package is provided, such that the AS 60 being subscribed to this event package can get a more accurate information about the availability of the subscriber.

Figure 4:
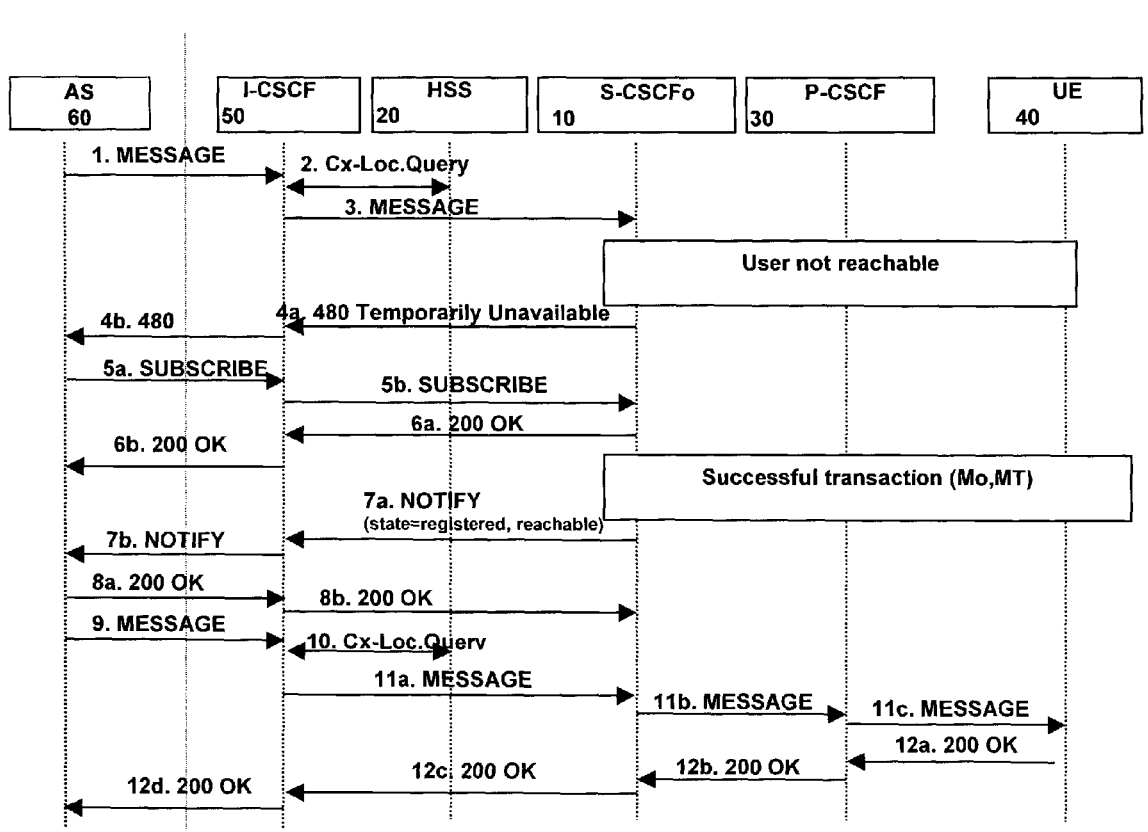
FIG. 4 shows a message signaling an processing diagram indicating a subscription to a registration state event package according to the third preferred embodiment.

FIG. 4 shows a signaling diagram indicating a subscription of the AS 60 to the state event package of the IMS subscriber of the UE 40. In step 1, an MMS notification is routed in a SIP MESSAGE request, as defined in the IETF specification RFC 3428, to the I-CSCF 50 which initiates a query to the HSS 20 in step 2 to obtain a routing information to the current S-CSCFo 10 serving the UE 40. Having received the routing information, the I-CSCF 50 forwards the SIP MESSAGE request in step 3 to the S-CSCFo 10. Then, it may be determined that the UE 40 is not reachable at present. The terminating S-CSCFo 10 can decide at this point that the immediate messages are not forwarded to the terminating user. The decision can be based on some application logic or based on e.g. the caller preferences and/or the callee capabilities. The required information can be gained at the P-CSCF 30 which may indicate the non-reachable state in an error cause of a response message, e.g. the SIP 480 Temporarily Unavailable message. According to the IETF specification RFC 3261, a reason phrase in the response message can be used to convey the event state information. For example, the corresponding Status Line may be represented as follows:

Status Line=SIP-Version SP Status-Code SP Reason-Phrase CRLF

The determination of the unreachable state of the UE 40 may be based on an expired timeout at the P-CSCF 30 waiting for a response to the MESSAGE request directed to the UE 40. The P-CSCF 30 therefore assumes that the UE 40 is not reachable, and generates the response message indicating the unreachable state.

Accordingly, a message SIP 480 Temporary Unavailable indicating that the subscriber has not been found or is not available is issued in steps 4*a* and 4*b* via the I-CSCF 50 to the AS 60.

In response to this negative reply, the AS 60 forwards a SIP SUBSCRIBE request via the I-CSCF 50 and after the HSS query (not shown) to the S-CSCFo 10 in steps 5*a* and 5*b*. The S-CSCFo 10 acknowledges the subscription by a SIP 200 OK acknowledgement routed via the I-CSCF 50 to the AS 60 in steps 6*a* and 6*b*. As soon as a successful transaction of the UE 40 is determined by the S-CSCFo 10, such as a mobile originated transaction or a mobile terminated transaction or a re-registration of the UE 40, the S-CSCFo 10 issues a SIP NOTIFY request including a state "registered" and an event "reachable" via the I-CSCF 50 to the AS 60 in steps 7*a* and 7*b*. The NOTIFY request is acknowledged by the AS 60 in steps 8*a* and 8*b* by a corresponding SIP 200 OK response.

Accordingly, the AS 60 is informed that the UE 40 is reachable again and can now forward the SIP MESSAGE request including the MMS notification via the I-CSCF 50 in step 9 (including HSS query by the I-CSCF 50 in step 10), and the S-CSCFo 10 and the P-CSCF 30 to the UE 40 in steps 11*a* to 11*c*. In response thereto, the UE 40 forwards a SIP 200 OK acknowledgement to the AS 60 in steps 12*a* to 12*d*.

As a result, the AS 60 can be informed about the connection state of the UE 40 and can thus be enabled to successfully forward the MMS notification to the UE 40.

It is noted that the present invention is not restricted to the embodiments described above. The present invention may be implemented in any data network, where a subscription to a registration state of a subscriber can be implemented to thereby inform a subscriber of a reachable or non-reachable state or a re-registration of a concerned network user. The embodiments may thus vary within the scope of the attached claims.

The invention claimed is:

1. A method, comprising:
receiving, by an application server, a session initiation protocol response indicating that a network user is not reachable, and wherein the session initiation protocol response includes information about the network user being unregistered and temporarily unavailable; and
routing, by the application server, a message to the network user, when the user is available again by at least:
subscribing, by the application server, to a state event package of the network user by sending a subscribe message; and
receiving, at the application server, a notification when a first state of the network user is changed to indicate a second state comprising the network user is available again,
wherein the subscribing is performed in response to the receipt of the session initiation protocol response indicating that the network user is not reachable, and
wherein the routing is performed in response to receiving the notification, wherein the notification includes a subscription-state header indicating a subscription state of the state event package, wherein the notification comprises a session initiation protocol notification.

2. The method of claim 1, wherein the message comprises a first session initiation protocol message, wherein the notification comprises a second session initiation protocol message, and wherein the network user comprises a user of an internet protocol multimedia system of a wireless network.

3. The method of claim 1, wherein the notification comprises a session initiation protocol notification comprising information indicating the network user is registered or reachable again.

4. The method of claim 1, wherein the notification comprises a session initiation protocol notification comprising information indicating that the network user is either reachable or out of coverage.

5. The method of claim 4, wherein the information comprises an event or flag information.

6. The method of claim 4, wherein the information is set, after an initial registration of the network user, to the second state indicating that the network user is available.

7. The method of claim 4, wherein the information is set to the first state indicating that the network user is out of coverage, when terminal traffic to the network user has failed.

8. The method of claim 7, wherein the information is set to the first state indicating that the network user is out of the coverage determined based on an error cause of a response message.

9. The method of claim 4, wherein the information indicates that the network user is reachable, based on a terminal device of the network user performing an outgoing session set-up or a re-registration.

10. The method of claim 1, wherein the notification is based on a notification about a re-assignment of the network user.

11. The method of claim 10, further comprising: refreshing the subscribe message in response to a re-registration.

12. The method of claim 1, wherein the routing comprises routing the message comprising a multimedia messaging service notification.

13. The method of claim 1, wherein the state event package comprises a session initiation protocol registration state event package.

14. The method of claim 1, wherein the session initiation protocol response indicating that the network user is not reachable is received from a serving call state control function via an interrogating call state control function of a wireless network and the subscribe message is sent to the serving call state control function via the interrogating call state control function.

15. An apparatus, comprising:
at least one processor; and
at least one memory including computer program code, the at least one processor, the at least one memory, and the computer program code configured to cause the apparatus to at least:
  receive, by an application server, a session initiation protocol response indicating that a network user is not reachable, wherein the session initiation protocol response includes information about the network user being unregistered and temporarily unavailable, wherein when the user is available again the processor is further configured to route a message to the network user by causing the apparatus to at least:
  subscribe, by the application server, to a state event package of the network user by sending a subscribe message;
  receive, at the application server, a notification when a first state of the network user is changed to indicate a second state comprising the network user is available again,
  wherein the subscribing is performed in response to the receipt of the session initiation protocol response indicating that the network user is not reachable, and
  wherein the routing is performed in response to receiving the notification, wherein the notification includes a subscription-state header indicating a subscription state of the state event package, wherein the notification comprises a session initiation protocol notification.

16. The apparatus of claim 15, wherein the notification comprises a session initiation protocol notification comprising information indicating that the network user is either reachable or out of coverage.

17. The apparatus of claim 16, wherein the processor is configured to set the information to the second state indicating that the network user is available, after an initial registration of the network user or when a terminal device of the network user performs an outgoing session set-up or an incoming session setup attempt is successful.

18. The apparatus of claim 16, wherein the processor is configured to set the information to the first state indicating that the network user is out of coverage, when terminal traffic to the network user has failed.

19. The apparatus of claim 15, wherein the processor is comprised in a call state control function of an internet protocol multimedia subsystem network.

20. The apparatus of claim 15, wherein the state event package comprises a session initiation protocol registration state event package.

21. The apparatus of claim 15, wherein the session initiation protocol response indicating that the network user is not reachable is received from a serving call state control function via an interrogating call state control function of a wireless network and the subscribe message is sent to the serving call state control function via the interrogating call state control function.

\* \* \* \* \*